United States Patent [19]

Foote

[11] 4,041,279
[45] Aug. 9, 1977

[54] DATA READING DEVICE

[75] Inventor: Francis C. Foote, Rocky River, Ohio

[73] Assignee: Addressograph Multigraph Corporation, Cleveland, Ohio

[21] Appl. No.: 601,541

[22] Filed: Aug. 4, 1975

[51] Int. Cl.² .................... G06K 5/00; G06K 7/08; G06K 7/10

[52] U.S. Cl. .................... 235/61.7 B; 235/61.11 D; 235/61.11 E

[58] Field of Search ................. 235/61.12 R, 61.12 N, 235/61.12 M, 61.11 D, 61.11 E, 61.7 B; 340/146.3 D

[56] References Cited

U.S. PATENT DOCUMENTS

| | | | |
|---|---|---|---|
| 3,245,697 | 4/1966 | Nugent | 283/7 |
| 3,612,835 | 10/1971 | Andrews et al. | 235/61.11 D |
| 3,740,530 | 6/1973 | Hoffer et al. | 235/61.7 B |
| 3,761,683 | 9/1973 | Rogers | 235/61.7 B |
| 3,764,978 | 10/1973 | Tyburski et al. | 340/146.3 D |
| 3,793,600 | 2/1974 | Grossbard | 235/61.12 N |

Primary Examiner—Daryl W. Cook
Attorney, Agent, or Firm—Harry M. Fleck, Jr.

[57] ABSTRACT

A device is provided for reading optical and magnetic data and providing signals representative thereof, said device including means for establishing a predetermined time or spacial reference between the optical and magnetic data sets. In one embodiment the optical and magnetic read heads are mounted in parallel alignment with the path of document travel to reduce timing errors due to skewing. In a second embodiment the heads are mounted side-by-side such that timing errors due to speed variations and thermal expansions are reduced.

11 Claims, 8 Drawing Figures

DATA READING DEVICE

BACKGROUND OF THE INVENTION

The present invention is generally related to data capture devices and, more particularly, to a device for reading both optical and magnetic data from a credit card or other document.

In recent years, many credit cards have been provided with magnetic areas containing data relative to the card holder and associated account. Generally, these areas are defined by a stripe of magnetic material disposed longitudinally on the card. An appropriate magnetic read head is passed over the stripe to provide signals representative of the magnetic data. Movement may be achieved by way of a card transport, with the magnetic read head being held stationary. Alternately, means may be provided to move the read head while holding the card stationary. Such transport mechanisms are well known and many are commercially available.

While the magnetic stripe is a convenient means for storing information on a credit card it may be easily copied and duplicated by such well known techniques as "skimming". Thus, it is relatively simple and inexpensive for one to produce counterfeit credit cards. More recently, it has been proposed to provide credit cards with optical data elements, in addition to the magnetic stripe data, whereby the pair of data sets may be utilized to determine the authenticity of the card. Such a security feature is disclosed in copening U.S. patent application Ser. No. 381,351, filed May 27, 1975 in the name of Francis C. Foote and assigned to the assignee of the present invention. Briefly, the security feature entails the use of a security code or the like which is defined at least in part by the spacial relationship between the optical and magnetic data elements on the card. After encoding, each card is assigned a corresponding security code which is recorded at a CPU or validation module for subsequent comparison with a code generated when the card is presented and read at a remote terminal. A favorable comparison within predetermined limits by this system indicates that the card is authentic, while the absence of such a comparison indicates that the card is counterfeit. In order to produce a counterfeit or duplicate card it is necessary to reproduce both data sets as well as the spacial relationship between the two. This, of course, cannot be achieved by "skimming" and would require considerable time and expense, as well as the use of sophisticated equipment to produce merely a single counterfeit card.

SUMMARY OF THE INVENTION

In order to extract the data from each card, it is necessary to provide a device for sensing both optical and magnetic data elements and some means for preserving the spacial relationship between such elements. The device of the present invention reads optical and magnetic data and includes an optical read head having a radiation surface and sensor for detecting radiation reflected by the optical data elements. The device further includes means for establishing a predetermined reference or time base between signals associated with the optical and magnetic data, such that the existence of the spacial relationship between the data elements may be determined.

It is a primary object of the present invention to provide a novel device for reading both optical and magnetic data from a credit card or other document.

Another object of the present invention is to provide a unique optical and magnetic data reader including a magnetic read head and an optical reader comprising a radiation source and associated sensor for detecting radiation reflected by the optical data elements.

It is a further object of the present invention to provide a versatile device for sensing optical and magnetic data from a document and including means for establishing a predetermined reference or time base between the resultant data signals whereby the authenticity of the document may be determined.

Still a further object of the present invention is to provide a unique reading device for sensing optical and magnetic data elements disposed in a common data area on a credit card or other document.

BRIEF DESCRITPION OF THE DRAWINGS

DESCRIPTION OF THE PREFERRED EMBODIMENT

Figure 1:
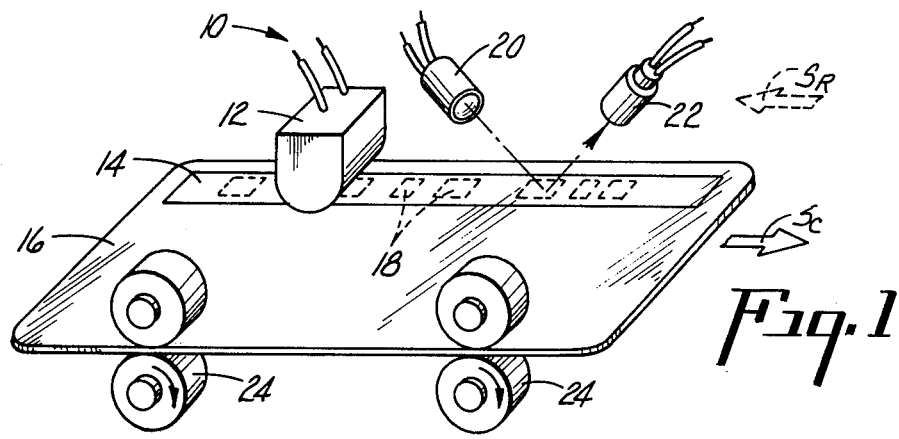
FIG. 1 is a simplified perspective view of the reading device of the present invention shown in combination with a typical credit card containing optical and magnetic data.
Figure 2:
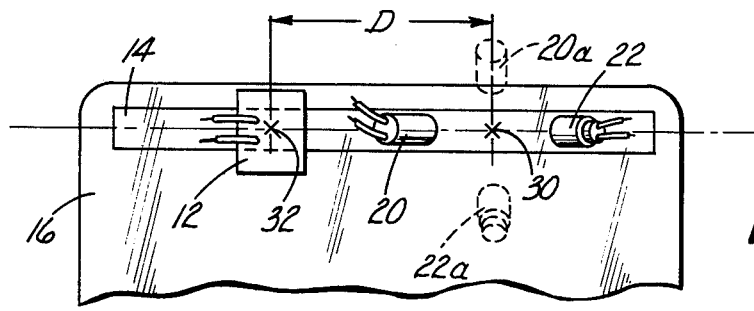
FIG. 2 is a partial plan view of the reading device illustrated in FIG. 1.

Referring now, more particularly, to FIGS. 1 and 2 of the drawings, the data reading device of the present invention is generally indicated by the numeral 10 and includes a magnetic read head 12 for sensing data from a magnetic stripe 14 carried by a card or doucment 16. Preferably, read head 12 is of conventional construction and capable of reading single or multiple tracks of data from a magnetic stripe 14. The card also contains an optical data set which is defined by a plurality of reflective elements 18 which underlie and are generally superposed with the area of magnetic stripe 14. A detailed description of the card structure and the nature of the reflective elements appears in the above-referenced patent application to Francis C. Foote. As described in this application, the reflective elements may be defined by metallic areas which are vapor deposited beneath the magnetic media such that they are concealed against detection with visible radiation. Once the card has been encoded, there is a fixed spacial relationship between the magnetic data elements (flux reversals) and the edges of the optical elements. This spacial relationship is utilized to define a security code for the particular card. In order to produce another card which will provide the same security code upon reading, it is necessary to duplicate both the magnetic and optical data patterns and fix such in the proper spacial relationship within a card structure. The high degree of difficulty in successfully accomplishing this task significantly reduces the likelihood of counterfeit cards being placed into circulation without detection by the reading device of the present invention.

The presence of the reflective elements beneath the magnetic stripe is detected through the use of infrared radiation provided by a radiation source 20. Preferably, source 20 provides a beam of radiation which may be focussed by appropriate optical means, such as lenses, optical slits, mirrors and the like. The nature of the particular magnetic media is such that it is substantially transparent to the infrared radiation. If the incident beam of infrared radiation, which penetrates the magnetic media, strikes a reflective element, a substantial portion of the radiation is refleced to an infrared detector 22 which generates corresponding electrical output signals. These signals, together with those from the magnetic read head are processed by appropriate circuitry and preferably converted into digital data.

The reading is provided with an appropriate transport means to effect relative movement between magnetic and optical data readers. Such a transport means is illustrated in simplified, form by drive rollers 24 which effect the movement of card 16 in a direction indicated by arrow $S_C$. Alternately, relative movement for reading the data may be effected by moving the magnetic and optical read heads in a direction indicated by arrow $S_R$ while holding the card stationary. Both types of transport means are well known to those skilled in the art and a detailed description of such is deemed unnecessary for the purposes of this application. Radiation from source 20 intersects the underlying reflective elements in a small area or location indicated at 30. This is the effective reading aperture or location for the optical read head. Alternate locations for source 20 and detector 22 are shown at 20a and 22a. Magnetic read head 12 includes an air gap or magnetic reluctance which is generally less than 10 mils. in width. The effective reading location for the magnetic head lies at approximately mid-position of the reluctance aperture and is indicated by the numeral 32 in FIG. 2. The distance or space separating the effective magnetic and optical read locations is indicated by the dimension D. It will be appreciated that the effective reading locations 30 and 32 lie along a line substantially parallel to the direction of card (or head) travel. This assures that the optical edges which are sensed lie directly below or in superposed relation with, the path or locus of the magnetic read head. This reduces or eliminates timing which may result due to skewing of the card and/or head during reading, or due to the optical edges being skewed or non-perpendicular to the direction of travel.

As mentioned above, the card security feature is defined at least in part by the spacial relationship between the optical and magnetic data elements. The system may analyze the relative positions of the leading and/or trailing edges of the optical elements and their relative positions to the flux reversals from one of the magnetic tracks. The existence, or non-existence, of such a predetermined spacial relationship is determined from the electrical signals generated by the optical and magnetic read heads. The time or spacial relationship between the optical and magnetic output signals will be dependent upon the distance or spacing D between the effective read locations 30 and 32. In order that authentic cards be accepted by all terminals within a system, it is necessary to provide some means for establishing a predetermined reference between the resultant signals generated by the optical and magnetic read heads. This assures that the time or spacial relationship between the signals (or resultant digital data) will be substantially the same (for the same card) within acceptable tolerances from terminal-to-terminal. This may be achieved by maintaining dimension D substantially the same for all terminals within the system.

Figure 3:
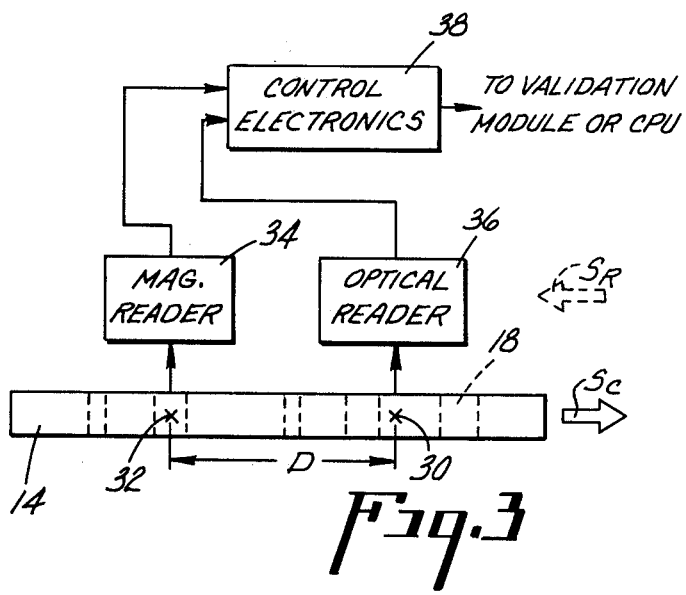
FIG. 3 is a block diagram of a first embodiment of the circuitry associated with the present invention.
Figure 4:
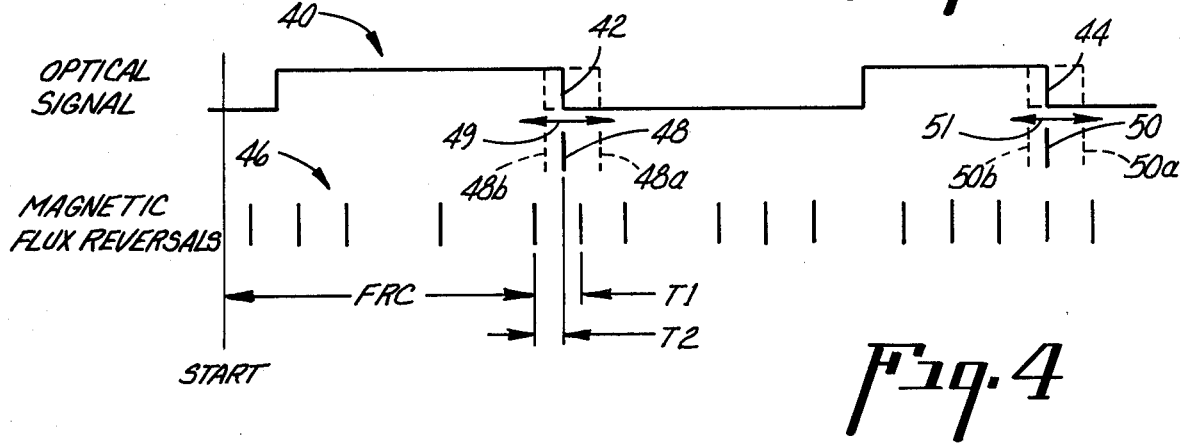
FIG. 4 is a timing diagram illustrating the relationship between elements of the optical and magnetic data sets.

Referring to FIGS. 3 and 4, the manner by which the predetermined reference is established may be more fully understood. Magnetic and optical reader blocks 34 and 36 are illustrated which include, in addition to the read heads, appropriate circuitry for processing the output signals to provide their digital equivalent. Such may include means for filtering out noise picked up by either the optical or magnetic read heads. The resultant magnetic and optical data signals are fed to appropriate control electronics 38 which includes means for storing that portion of the data which is utilized by the system to define the security feature. This data may take the form of a plurality of security words which are subsequently transmitted to a CPU or validation module for comparison with security words previously recorded at the CPU, or alternatively on the card itself, for the particular card. Such an arrangment is disclosed in the above-reference patent application in the name of Francis C. Foote. In this case, each of the security words defines the position of an optical edge with respect to the magnetic flux reversals in terms of the count of the flux reversal preceding the edge plus data defining the distance of the edge from the flux reversal. The data is expressed in terms of clock counts of an appropriate frequency (for example 13.33 KHz) such that the optical edge positions may be determined with a high degree of accuracy. It will be appreciated, of course, that this data is no more accurate than the accuracy with which the dimension D is set for each terminal. Satisfactory accuracy may be achieved by providing a standard or reference card containing optical and magnetic data of known characteristics. The card is passed through the reading device and the resultant data is analyzed to determine whether or not dimension D has been set within an acceptable tolerance. If the dimension is unacceptable, the effective reading location of the magnetic and/or optical reader are mechanically adjusted and the standard card reading procedure is repeated until predetermined reference has been established within acceptable limits.

With reference to FIG. 4 a portion of a typical optical signal pattern is generally indicated by the numeral 40 and includes a pair of trailing edges 42 and 44 corresponding to sensed edges of reflective elements and resulting in digital data signals 48 and 50. The magnetic data is defined by a plurality of flux reversals generally indicated by the numeral 46. If the security words such as described in the above-referenced patent application are utilized, the system observes the leading or trailing edges. For the purposes of this explanation it is assumed that the system observes the trailing edges, resulting in digital data signals 48 and 50. The locations of the edge signals relative to the magnetic flux reversals are expressed in terms of a flux reversal count FRC plus a fraction of the subsequent flux reversal time interval expressed in terms of T1 and T2 (for example T1/T2). It will be appreciated that a change in dimension D will have the effect of shifting the locations of the optical edge signals 48 and 50 to the right or left as indicated by arrows 49 and 51. By increasing dimension D, the optical edge signals effectively will be shifted to the right to locations indicated at 48a and 50a. Similarly, a decrease in dimension D will effect a shift of the optical edge to the left as indicated at 48b and 50b.

Figure 5:
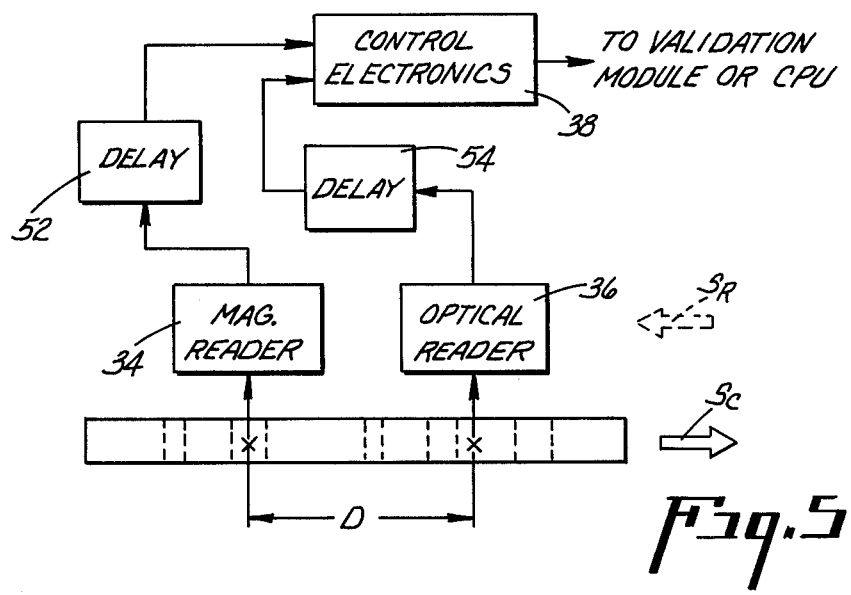
FIG. 5 is a block diagram of a second embodiment of the circuitry associated with the present invention.

The effective shift between the otpical and magnetic data sets may be effected by means other than mechanically changing the spacing between the effective reading locations as explained above. With the reference to FIG. 5, it will be observed that the circuitry of the reading device may be modified to include line delays 52 and 54 connected to the ouputs of the magnetic and optical readers. Such delay circuits are well known to those skilled in the art and provide a means for delaying transmission of the digital data for some predetermined time interval. This circuitry may include means of adjusting the time delay interval, whereby the predetermined reference may be established between the optical and magnetic data sets. The adjustment procedure would entail the use of the above-described standard or reference card and may be used in combination with a mechanical adjustment of dimension D. Of course, it is not intended that the present invention be limited to the use of a pair of delays, as a single delay in one of the lines may be satisfactory for adjustment purposes.

Figure 6:
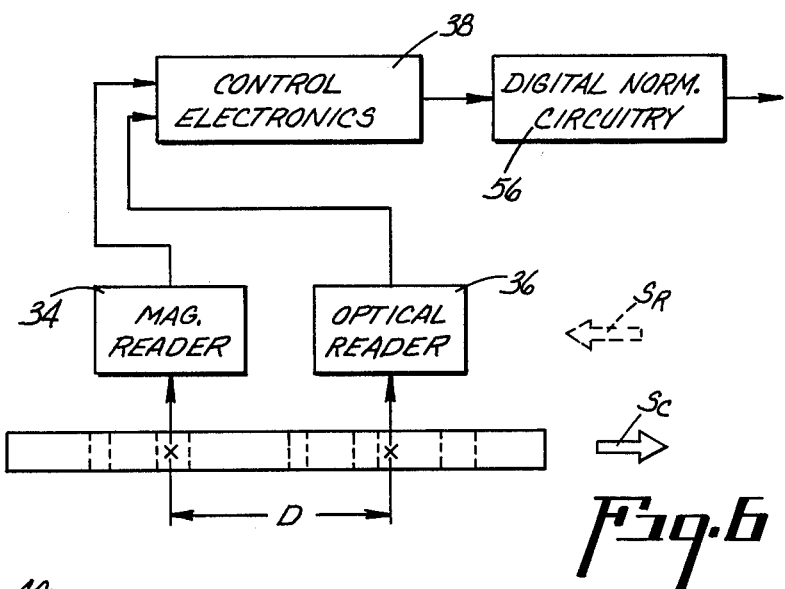
FIG. 6 is a block diagram of a third embodiment of the circuitry associated with the present invention.

FIG. 6 illustrates a third embodiment of the circuitry associated with the present invention which includes a digital normalization circuit 56 which applies a digital correction factor to the data output by the control electronics 38. Such circuitry synthesizes an effective shift between the optical and magnetic data pertinent to the security words and may be used alone or in conjunction with the above-described line delays or dimensional adjustment means to establish the predetermined time or spacial reference.

The embodiment of the invention illustrated in FIGS. 1 and 2 provides for mounting of the magnetic and optical read heads such that their effective reading locations lie along a path substantially parallel to the direction of card (or head) travel. This arrangement avoids timing errors which may result due to skewing of the card during transport. However, such a mounting arrangement inherently requires that the effective locations be spaced apart by some dimension D. Thus, if the transport acceleration cannot be held within acceptable limits or there is significant thermal expansion either of the card or between the read heads, timing errors may still result between the two data sets.

Figure 7:
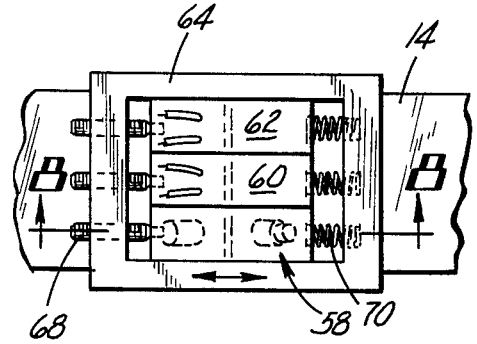
FIG. 7 is a top plan view of an alternate mounting configuration for the optical and magnetic read heads.
Figure 8:
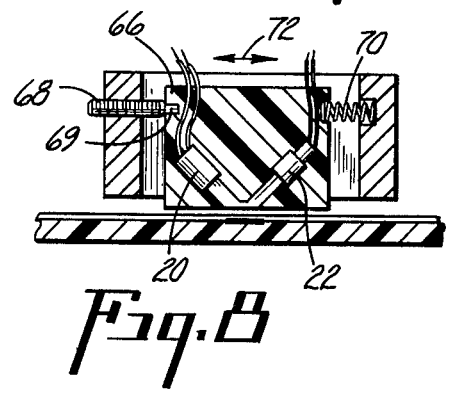
FIG. 8 is a sectional view taken along section 8—8 of FIG. 7.

Timing errors due to variations in transport speed and thermal expansion may be significantly reduced or eliminated by mounting the optical and magnetic read heads in side-by-side relationship. Such an assembly is illustrated in FIGS. 7 and 8 and includes an optical head 58 and a pair of magnetic heads 60 and 62 mounted to a common frame 64. While two magnetic heads are illustrated for reading data from two magnetic tracks, it is foreseeable that a single (or triple) magnetic read head may be utilized instead, depending upon the nature of the system and the magnetic stripe data. The optical read head includes a main housing or body 66 which carries radiation source 20 and sensor 22. The housing is mounted to frame 64 by way of an adjustment screw 68 and a coil compression spring 70. Adjustment screw 68 is threaded to frame 64 and includes an end portion 69 which is journaled to housing 66 to help maintain such in proper orientation. Compression spring 70 is relatively short in length and as such also aids in maintaining housing 66 in proper orientation. If desired, additional mounting means such as a channel-groove mounting may be utilized to assure proper orientation of housing 66.

It will be appreciated, that the position of the optical read head housing may be adjusted through screw 68, whereby the effective optical reading location is shifted longitudinally as indicated by arrow 72. This allows the predetermined time/spacial relationship to be set by following the general procedure described above. Magnetic read heads 60 and 62 are mounted to frame 64 in a manner similar to the optical read head, such that their reading locations may also be adjusted longitudinally.

It will be appreciated that since the optical read head 58 is mounted in side-by-side relationship to the magnetic read head, it is possible to set the dimension D to zero, such that the magnetic and optical signals will correspond directly to their actual spacial relationship with the card structure. Of course, it may be desirable for reasons of security, or otherwise, to still provide some dimensional spacing D between the magnetic and optical read locations and the assembly illustrated to FIGS. 7 and 8 may be adjusted to provide for such.

From the foregoing description it will be appreciated that the reading device of the present invention provides a versatile means of reading both optical and magnetic data from a document and establishing some predetermined reference between the resultant signals whereby the authenticity of the document may be determined. Both mounting configurations illustrated in FIGS. 1 and 7 readily lend themselves to providing spacial adjustment, whereby the predetermined time/-spacial relationship may be established. The in-line mounting configuration illustrated in FIGS. 1 and 2 reduces the likelihood of timing errors due to card skewing. The side-by-side mounting arrangement illustrated in FIGS. 7 and 8 permits the spacing between the optical and magnetic read locations to be reduced to zero, if desired, such that timing errors due to speed variations or thermal expansion may be eliminated.

Since the foregoing description and drawings are merely illustrative, the scope of protection of the invention has been more broadly stated in the following claims and these should be liberally interpreted so as to obtain the benefit of all equivalence to which the invention is fairly entitled.

I claim:

1. A device for reading documents containing optical data elements and magnetic data elements separate from said optical data elements and with fixed spacial relationships between said optical and magnetic data elements, said device comprising:

magnetic read means for sensing magnetic data elements from a document and providing first signals representative thereof, optical read means for sensing said optical data elements from the document and providing second signals representative thereof, and means associated with said magnetic and optical read means for establishing a predetermined reference between said first and second signals whereby the presence or absence of the spacial relationship between the optical and magnetic data elements may be determined.

2. The device set forth in claim 1 wherein said predetermined reference defines at least in part a perceived spacial base.

3. The device set forth in claim 1 wherein said predetermined base defines at least inpart a predetermined time base.

4. The device set forth in claim 3 wherein said means for establishing the time base between said first second signals includes time delay circuit means.

5. The device set forth in claim 3 wherein said means for establishing the time base between said first and second signals includes logic means for digitally establishing the time base.

6. The device set forth in claim 1 wherein said means for establishing the reference between said first and second signals comprises means for establishing a predetermined spacial relationship between said optical read means and magnetic read means.

7. The device set forth in claim 6 wherein said magnetic read means includes a magnetic read head having an effective reading aperture at a first location, said optical read means including a radiation source providing radiation which intersects the data area at a second location and a radiation sensor for sensing radiation reflected therefrom, said spacial relationship being defined at least in part by the distance between said first and second locations.

8. The device set forth in claim 7 wherein said optical and magnetic data elements are disposed in a common data area on the document being read, said device further including motive means for effecting relative movement between the document being read and said magnetic and optical read means, said first and second locations lying along a line substantially parallel to said direction of relative movement.

9. The device set forth in claim 8 wherein the data area on the document being read is of generally elongated configuration, said direction of relative movement being substantially parallel to the data area during reading.

10. In combination:
a document containing optical data elements and magnetic data elements separate from said optical data elements and with a fixed spacial relationship between said optical and magnetic data elements, and
a device for reading document, said device comprising:
magnetic read means for sensing said magnetic data elements from a document and providing for signals representative thereof,
optical read means for sensing said optical data elements from the document and providing second signals representative thereof;
motive means for effecting relative movement between said document being read and said magnetic and optical read means, and
means associated with said magnetic and optical read means for establishing a predetermined reference between said first and second signals whereby the presence or absence of the spacial relationship between the optical and magnetic data elements may be determined.

11. The combination set forth in claim 10 wherein said optical and magnetic data elements are disposed in a common area on said document, said data area being of generally elongated configuration and said direction of relative movement being substantially parallel to said data area during reading.

* * * * *

UNITED STATES PATENT AND TRADEMARK OFFICE
CERTIFICATE OF CORRECTION

PATENT NO. : 4,041,279
DATED : August 9, 1977
INVENTOR(S) : Francis C. Foote

It is certified that error appears in the above-identified patent and that said Letters Patent are hereby corrected as shown below:

Column 3, line 13, "refleced" should be deleted and "reflected" substituted therefor; line 18, after the word "reading" insert "device"; line 21, after the word "simplified", delete the comma; line 47 after the word "timing" insert "errors".

Column 4, line 42, "location" should be deleted and "locations" substituted therefor; line 44, after the word "until" insert "the"; line 55 after the word "trailing" insert "optical".

Column 6, line 15, "with" should be deleted and "within" substituted therefor; line 18, "to" should be deleted and "in" substituted therefor.

Signed and Sealed this

Twenty-first Day of February 1978

[SEAL]

Attest:

RUTH C. MASON
Attesting Officer

LUTRELLE F. PARKER
Acting Commissioner of Patents and Trademarks